United States Patent
Tang et al.

(10) Patent No.: US 11,127,001 B2
(45) Date of Patent: Sep. 21, 2021

(54) SYSTEMS AND METHODS FOR SECURE COMMUNICATION

(71) Applicants: Dresser, Inc., Austin, TX (US); Wayne Fueling Systems LLC, Addison, TX (US)

(72) Inventors: Weiming Tang, Austin, TX (US); James Matthew Brewer, Austin, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 1575 days.

(21) Appl. No.: 13/890,734

(22) Filed: May 9, 2013

(65) Prior Publication Data

US 2014/0337234 A1    Nov. 13, 2014

(51) Int. Cl.
| | |
|---|---|
| *G06Q 20/38* | (2012.01) |
| *G06Q 20/32* | (2012.01) |
| *H04L 29/06* | (2006.01) |
| *H04L 9/32* | (2006.01) |
| *H04L 9/08* | (2006.01) |

(52) U.S. Cl.
CPC ..... *G06Q 20/3829* (2013.01); *G06Q 20/3278* (2013.01); *H04L 9/3265* (2013.01); *H04L 63/0823* (2013.01); *H04L 63/0869* (2013.01); *H04L 9/0869* (2013.01); *H04L 63/045* (2013.01); *H04L 2209/805* (2013.01); *H04L 2463/102* (2013.01)

(58) Field of Classification Search
CPC ........ G06F 11/00; G06F 21/14; G06F 21/554; G06F 2221/2115; G06F 11/1076; G06F 11/073; G06F 21/32; G06F 3/0488; G06Q 20/401; G06Q 20/3278; G06Q 20/36; G06Q 20/382; G06Q 20/405; G06Q 20/385; G06Q 20/4012; G06Q 30/02
See application file for complete search history.

(56) References Cited

U.S. PATENT DOCUMENTS

| | | | | |
|---|---|---|---|---|
| 6,005,945 | A * | 12/1999 | Whitehouse | G07B 17/0008 380/51 |
| 6,029,043 | A * | 2/2000 | Ho | G09B 5/065 273/432 |
| 6,229,894 | B1 * | 5/2001 | Van Oorschot | G06F 21/6209 709/229 |
| 7,443,984 | B2 | 10/2008 | Ishiguro et al. | |

(Continued)

FOREIGN PATENT DOCUMENTS

| | | |
|---|---|---|
| CN | 1383644 A | 12/2002 |
| CN | 1564514 A | 1/2005 |

(Continued)

OTHER PUBLICATIONS

Office Action for European Patent Application No. 14728765.0 dated Feb. 8, 2017.

(Continued)

*Primary Examiner* — Johann Y Choo
(74) *Attorney, Agent, or Firm* — Mintz Levin Cohn Ferris Glovsky and Popeo, P.C.

(57) ABSTRACT

In some embodiments, fast and secure communication can be achieved (e.g., in a fueling environment payment system) with systems and methods that validate an authentication request based on one or more pre-validated cryptographic keys.

23 Claims, 7 Drawing Sheets

(56) References Cited

U.S. PATENT DOCUMENTS

| | | | |
|---|---|---|---|
| 7,636,840 B2* | 12/2009 | Tang | G06Q 20/02 380/259 |
| 7,813,509 B2 | 10/2010 | Yan et al. | |
| 7,814,538 B2 | 10/2010 | Kuehnel et al. | |
| 7,822,688 B2 | 10/2010 | Labrou et al. | |
| 8,112,066 B2 | 2/2012 | Ben Ayed | |
| 8,171,534 B2 | 5/2012 | Chan et al. | |
| 8,229,852 B2 | 7/2012 | Carlson | |
| 8,621,216 B2* | 12/2013 | Husa | H04L 9/0861 380/260 |
| 9,276,910 B2* | 3/2016 | Tang | G06Q 20/3278 |
| 2001/0020274 A1 | 9/2001 | Shambroom | G06F 21/41 726/10 |
| 2001/0037302 A1* | 11/2001 | McFadzean | H04L 29/06 705/51 |
| 2002/0010861 A1* | 1/2002 | Matsuyama | H04L 63/0442 713/182 |
| 2002/0017561 A1* | 2/2002 | Tomoike | G06Q 20/04 235/383 |
| 2003/0188181 A1* | 10/2003 | Kunitz | G06F 21/6218 713/193 |
| 2005/0187873 A1 | 8/2005 | Labrou et al. | |
| 2005/0256742 A1* | 11/2005 | Kohan | G06F 19/322 705/2 |
| 2007/0074275 A1* | 3/2007 | Bajko | H04L 63/067 726/4 |
| 2007/0083750 A1* | 4/2007 | Miura | G06F 21/445 713/155 |
| 2007/0113071 A1* | 5/2007 | Lindinger | G06Q 20/341 713/156 |
| 2007/0116292 A1* | 5/2007 | Kurita | H04L 9/0844 380/270 |
| 2007/0136800 A1* | 6/2007 | Chan | H04L 9/3236 726/10 |
| 2007/0263869 A1* | 11/2007 | Oh | G06F 21/10 380/255 |
| 2008/0229110 A1 | 9/2008 | Balfanz et al. | |
| 2008/0294894 A1* | 11/2008 | Dubhashi | H04L 9/3271 713/168 |
| 2009/0092060 A1* | 4/2009 | Goto | H04L 63/0428 370/254 |
| 2009/0144194 A1* | 6/2009 | Dickelman | G06Q 20/10 705/39 |
| 2009/0220077 A1 | 9/2009 | Lee et al. | |
| 2011/0066513 A1 | 3/2011 | Fournier et al. | |
| 2011/0131102 A1 | 6/2011 | Wang | |
| 2011/0247063 A1* | 10/2011 | Aabye | G06F 21/445 726/6 |
| 2012/0118947 A1 | 5/2012 | Lyons et al. | |
| 2012/0284193 A1* | 11/2012 | Bharghavan | H04L 9/3263 705/64 |
| 2014/0229385 A1* | 8/2014 | Neafsey | G06Q 20/3674 705/67 |
| 2015/0143116 A1* | 5/2015 | Tang | G06Q 20/3278 713/168 |

FOREIGN PATENT DOCUMENTS

| | | |
|---|---|---|
| CN | 1658547 A | 8/2005 |
| CN | 1658551 A | 8/2005 |
| CN | 1767429 A | 5/2006 |
| CN | 101111056 A | 1/2008 |
| CN | 101420413 A | 4/2009 |
| CN | 100536395 C | 9/2009 |
| CN | 101682501 A | 3/2010 |
| EP | 1187390 A1 | 3/2002 |
| EP | 1653655 A1 | 5/2006 |

OTHER PUBLICATIONS

"International Preliminary Report on Patentability received for PCT International Application No. PCT/US2014/036526", dated Nov. 19, 2015, 7 pages.

"International Search Report and Written Opinion received for PCT Patent International Application No. PCT/US2014/036526", dated Sep. 25, 2014, 8 pages.

Office Action for Chinese Patent Application No. 201480039160.5 dated Mar. 4, 2019.

* cited by examiner

SYSTEMS AND METHODS FOR SECURE COMMUNICATION

FIELD

The subject matter disclosed herein generally relates to systems and methods for secure wireless communication, and more particularly to secure wireless payment in a fuel dispensing environment.

BACKGROUND

A number of mobile payment systems have been developed in which a mobile device can be used to pay for goods or services at a payment terminal. In some systems, the mobile device does not communicate directly with the payment terminal. Rather, the transaction is conducted between a mobile device payment infrastructure and a merchant payment infrastructure. Integrating these complex and widely-divergent infrastructures, however, can often be cost-prohibitive.

Other systems involve direct communication between the mobile device and the payment terminal. In such systems, sensitive user data such as payment and loyalty information is transmitted as cleartext, raising a number of security issues. For example, the sensitive user data can be intercepted by unscrupulous third parties. This can be of particular concern in fueling environments, where the payment terminal is often disposed in an unmanned, outdoor setting where there is an elevated risk of snooping or tampering. Users can be discouraged from using such systems for fear that the payment terminal may have been compromised.

While some secure communication schemes have been developed, they have not been applied in mobile payment systems. Moreover, they typically involve runtime validation of digital certificates and a complex handshaking procedure in which several rounds of large-payload data exchange occur. Such schemes thus introduce significant delays, and are cumbersome and time consuming for the user.

Accordingly, a need exists for improved mobile payment systems.

BRIEF DESCRIPTION

Fast and secure mobile communication can be achieved in some embodiments with systems and methods that validate an authentication request based on one or more pre-validated cryptographic keys.

Systems and methods for providing secure communication between a payment terminal and a mobile device, e.g., in a fueling environment, are disclosed herein. In some embodiments, the payment terminal and the mobile device conduct a mutual authentication process that, if successful, produces a session key which can be used to encrypt sensitive data to be exchanged between the payment terminal and the mobile device. The mutual authentication process can be expedited, for example by transferring a public key in place of a complete certificate and/or by maintaining at each device a database of pre-authenticated certificates indexed by a lookup table. The pre-authenticated certificates can be superior in a trust hierarchy to unit-level certificates associated with a particular mobile device or payment terminal, such that the amount of validation that must be performed at runtime is reduced.

BRIEF DESCRIPTION OF THE DRAWINGS

These and other features will be more readily understood from the following detailed description taken in conjunction with the accompanying drawings, in which.

Figure 1:
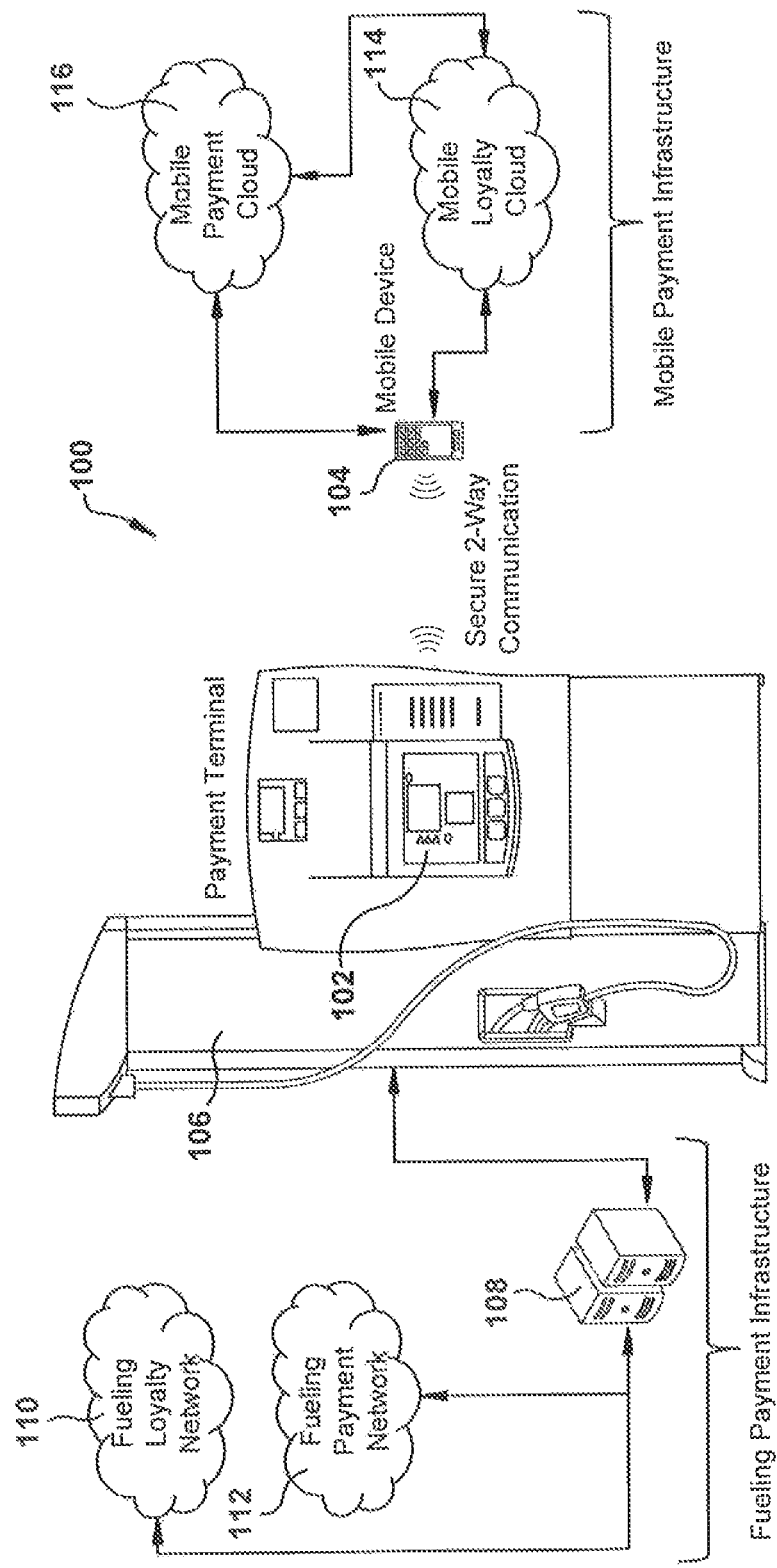
FIG. 1 is a schematic diagram of one exemplary embodiment of a fueling environment.

It is noted that the drawings are not necessarily to scale. The drawings are intended to depict only typical aspects of the subject matter disclosed herein, and therefore should not be considered as limiting the scope of the disclosure. In the drawings, like numbering represents like elements between the drawings.

DETAILED DESCRIPTION

Certain exemplary embodiments will now be described to provide an overall understanding of the principles of the structure, function, manufacture, and use of the devices, systems, and methods disclosed herein.

Systems and methods for providing secure communication between a payment terminal and a mobile device, e.g., in a fueling environment, are disclosed herein. In some embodiments, the payment terminal and the mobile device conduct a mutual authentication process that, if successful, produces a session key which can be used to encrypt sensitive data to be exchanged between the payment terminal and the mobile device. The mutual authentication process can be expedited, for example by transferring a public key in place of a complete certificate and/or by maintaining at each device a database of pre-authenticated certificates indexed by a lookup table. The pre-authenticated certificates can be superior in a trust hierarchy to unit-level certificates associated with a particular mobile device or payment terminal, such that the amount of validation that must be performed at runtime is reduced.

Fueling Environment

FIG. 1 illustrates an exemplary embodiment of a fueling environment 100 in which one or more of the systems and methods disclosed herein can be implemented. The fueling environment 100 generally includes a payment terminal 102 and a mobile device 104 associated with a user (e.g., a customer seeking to purchase fuel or service personnel seeking service access to the payment terminal).

The payment terminal 102 can be integrated with a fuel dispenser 106, which can include various features well understood by those skilled in the art such as a nozzle, a pump, buttons for selecting fuel grade, a display screen, and so forth. The payment terminal 102 can include a computer system, as described below. The payment terminal 102 can be coupled to a back end server 108, which can be configured to communicate with various networks, such as a fueling loyalty network 110 for maintaining, checking, and updating customer loyalty information and a fueling payment network 112 for processing fuel purchase and other transactions. Together, the back end server 108, the fueling loyalty network 110, and the fueling payment network 112 form a fueling payment infrastructure.

The mobile device 104 can also include a computer system, as described below. The mobile device 104 can be configured to communicate with various networks, such as a mobile loyalty cloud 114 for maintaining, checking, and updating customer loyalty information and a mobile payment cloud 116 for processing purchases and other transactions executed using the mobile device 104. The mobile loyalty cloud 114 and the mobile payment cloud 116 together form a mobile payment infrastructure. The mobile device 104 can be or can include any device that is configured to exchange data over a communications network, such as a mobile phone, tablet computer, laptop computer, digital wallet, and so forth. The mobile device can be held by a user or integrated with a movable object.

The payment terminal 102 and the mobile device 104 can mutually authenticate one another to facilitate secure communication of payment or other information directly between the payment terminal 102 and the mobile device 104. A secure communication channel between the payment terminal 102 and the mobile device 104 can allow for secure mobile payment without requiring the fueling payment infrastructure and the mobile payment infrastructure to be changed or integrated.

Although a fueling environment is shown in FIG. 1, it will be appreciated that the systems and methods disclosed herein can be readily applied in other settings, e.g., any setting in which a mobile device is used to conduct a transaction with a terminal. Transactions can include payment transactions, refund transactions, service transactions, control transactions, or any other transaction that requires communication. Terminals can include payment terminals, kiosks, and so forth, and/or can be part of a dispenser (e.g., a fuel dispenser, a snack or beverage dispenser, a cash dispenser, etc.).

Computer System

Figure 2:
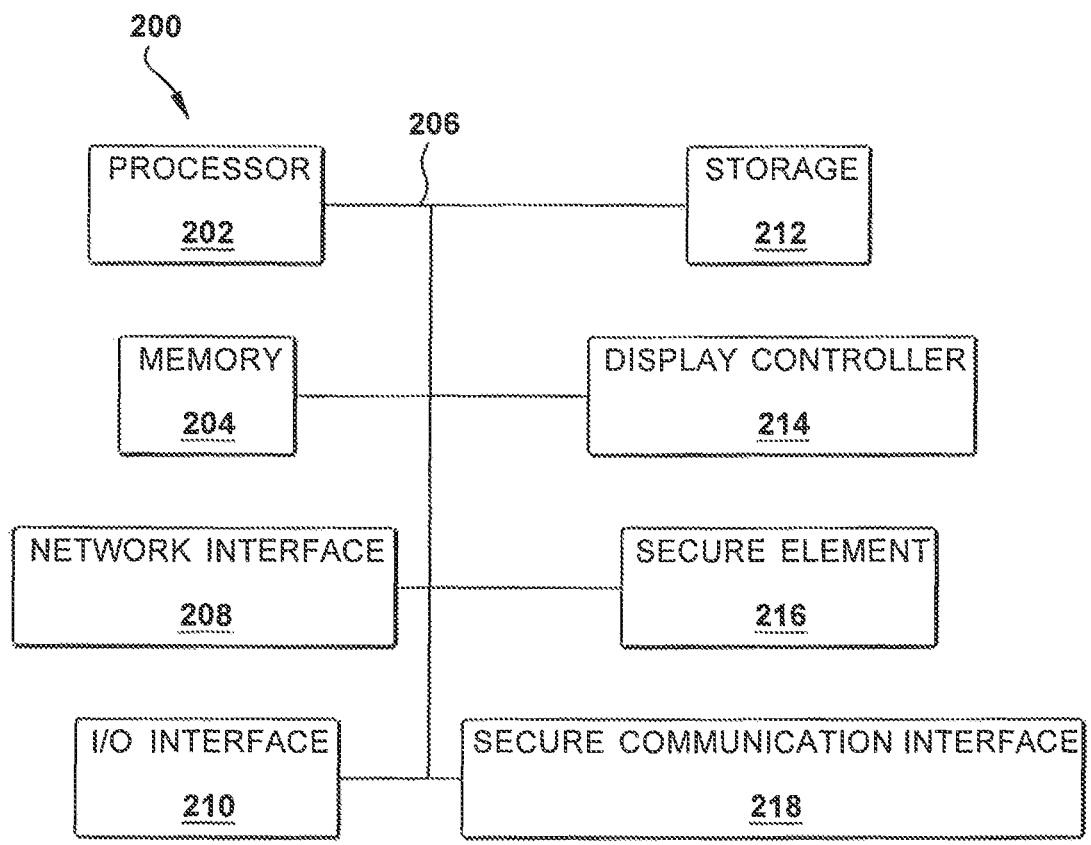
FIG. 2 is a schematic diagram of one exemplary embodiment of a computer system.

FIG. 2 illustrates an exemplary architecture of a computer system 200 which can be used to implement the payment terminal 102 or mobile device 104 of FIG. 1. Although an exemplary computer system 200 is depicted and described herein, it will be appreciated that this is for sake of generality and convenience. In other embodiments, the computer system may differ in architecture and operation from that shown and described here.

The computer system 200 can include a processor 202 which controls the operation of the computer system 200, for example by executing an operating system (OS), device drivers, application programs, and so forth. The processor 202 can include any type of microprocessor or central processing unit (CPU), including programmable general-purpose or special-purpose microprocessors and/or any of a variety of proprietary or commercially-available single or multi-processor systems.

The computer system 200 can also include a memory 204, which provides temporary or permanent storage for code to be executed by the processor 202 or for data that is processed by the processor 202. The memory 204 can include read-only memory (ROM), flash memory, one or more varieties of random access memory (RAM), and/or a combination of memory technologies.

The various elements of the computer system 200 can be coupled to one another. For example, the processor 202 can be coupled to the memory 204. The various elements of the computer system 200 can be directly coupled to one another or can be coupled to one another via one or more intermediate components. In the illustrated embodiment, the various elements of the computer system 200 are coupled to a bus system 206. The illustrated bus system 206 is an abstraction that represents any one or more separate physical busses, communication lines/interfaces, and/or multi-drop or point-to-point connections, connected by appropriate bridges, adapters, and/or controllers.

The computer system 200 can also include a network interface 208 which enables the computer system 200 to communicate with remote devices (e.g., other computer systems) over a network. In the case of the payment terminal 102, the network interface can facilitate communication with the back end server 108, the fueling loyalty network 110, and the fueling payment network 112. In the case of the mobile device 104, the network interface can facilitate communication with the mobile loyalty cloud 114 and the mobile payment cloud 116, for example via Wi-Fi or a cellular data network.

The computer system 200 can also include an input/output (I/O) interface 210 which facilitates communication between one or more input devices, one or more output devices, and the various other components of the computer system 200. Exemplary input and output devices include keypads, touchscreens, buttons, magnetic-stripe card readers, lights, speakers, and so forth.

The computer system 200 can also include a storage device 212, which can include any conventional medium for storing data in a non-volatile and/or non-transient manner. The storage device 212 can thus hold data and/or instructions in a persistent state (i.e., the value is retained despite interruption of power to the computer system 200). The storage device 212 can include one or more hard disk drives, flash drives, USB drives, optical drives, various media disks or cards, and/or any combination thereof and can be directly connected to the other components of the computer system 200 or remotely connected thereto, such as over a network.

The computer system 200 can also include a display controller 214 which can include a video processor and a video memory, and can generate images to be displayed on one or more displays in accordance with instructions received from the processor 202.

The computer system 200 can also include a secure element 216. The secure element 216 can be a tamper-resistant platform (e.g., a one-chip secure microcontroller) capable of securely hosting applications and their confidential and cryptographic data (e.g., key management) in accordance with the rules and security requirements set forth by a set of well-identified trusted authorities. The secure element 216 can be capable of providing random number generation, generating device-specific public/private key pairs, and executing a security algorithm. Known examples of security algorithms include, but are not limited to: Hash, TDES, AES, RSA, etc. Exemplary secure elements 216 include Universal Integrated Circuit Cards (UICC), embedded secure elements, and micro secure digital (microSD) cards.

The computer system 200 can also include a secure communication interface 218 through which the computer system 200 can conduct mutual authentication procedures and communicate with other computer systems. The secure communication interface 218 can be wireless (e.g., near-field communication (NFC), Wi-Fi, Bluetooth, and the like) or wired (e.g., USB or Ethernet). In the case of NFC, for example, the computer system 200 can include a radio transceiver configured to communicate with a radio transceiver of another device using one or more standards such as ISO/IEC 14443, FeliCa, ISO/IEC 18092, and those defined by the NFC Forum.

Modules Generally

The various functions performed by the payment terminal 102 and the mobile device 104 can be logically described as being performed by one or more modules. It will be appreciated that such modules can be implemented in hardware, software, or a combination thereof. It will further be appreciated that, when implemented in software, modules can be part of a single program or one or more separate programs, and can be implemented in a variety of contexts (e.g., as part of an operating system, a device driver, a standalone application, and/or combinations thereof). In addition, software embodying one or more modules can be stored as an executable program on one or more non-transitory computer-readable storage mediums. Functions disclosed herein as being performed by a particular module can also be performed by any other module or combination of modules, and the payment terminal 102 and the mobile device 104 can include fewer or more modules than what is shown and described herein.

Payment Terminal Modules

Figure 3:
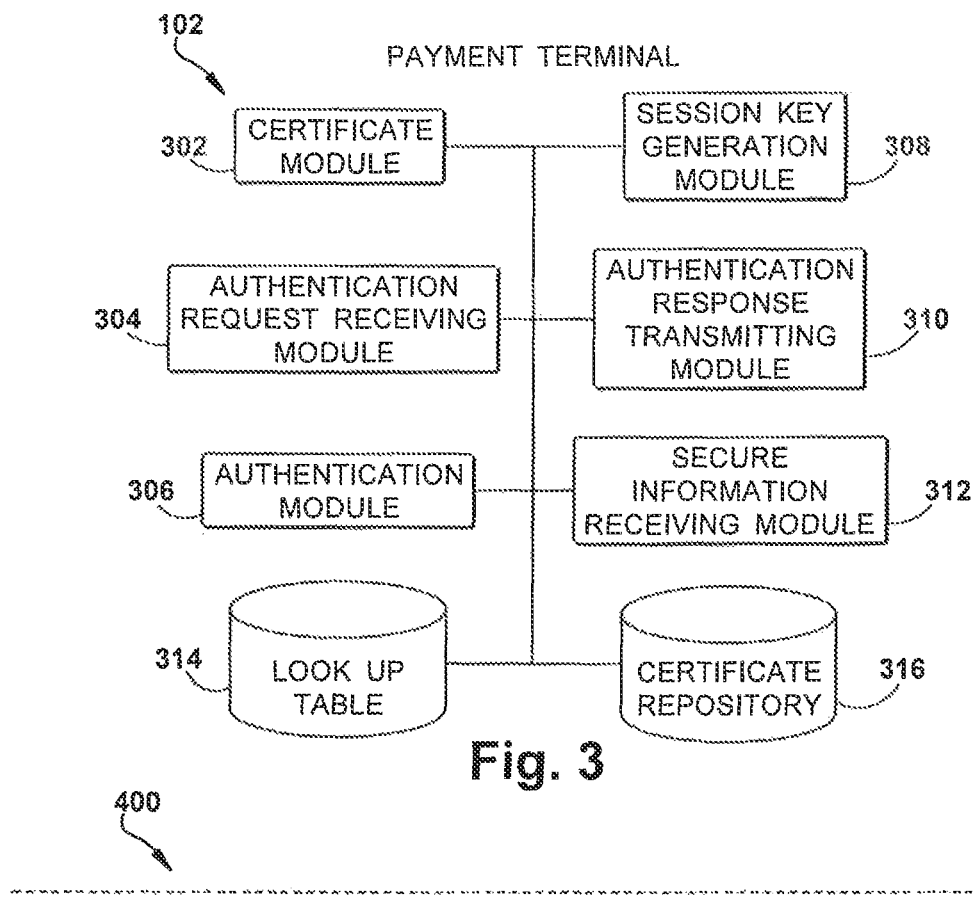
FIG. 3 is a schematic diagram of one exemplary embodiment of a payment terminal.

FIG. 3 is a schematic diagram of the modules of one exemplary embodiment of the payment terminal 102. As shown, the payment terminal 102 can include a certificate module 302, an authentication request receiving module 304, an authentication module 306, a session key generation module 308, an authentication response transmitting module 310, and a secure information receiving module 312.

Figure 4:
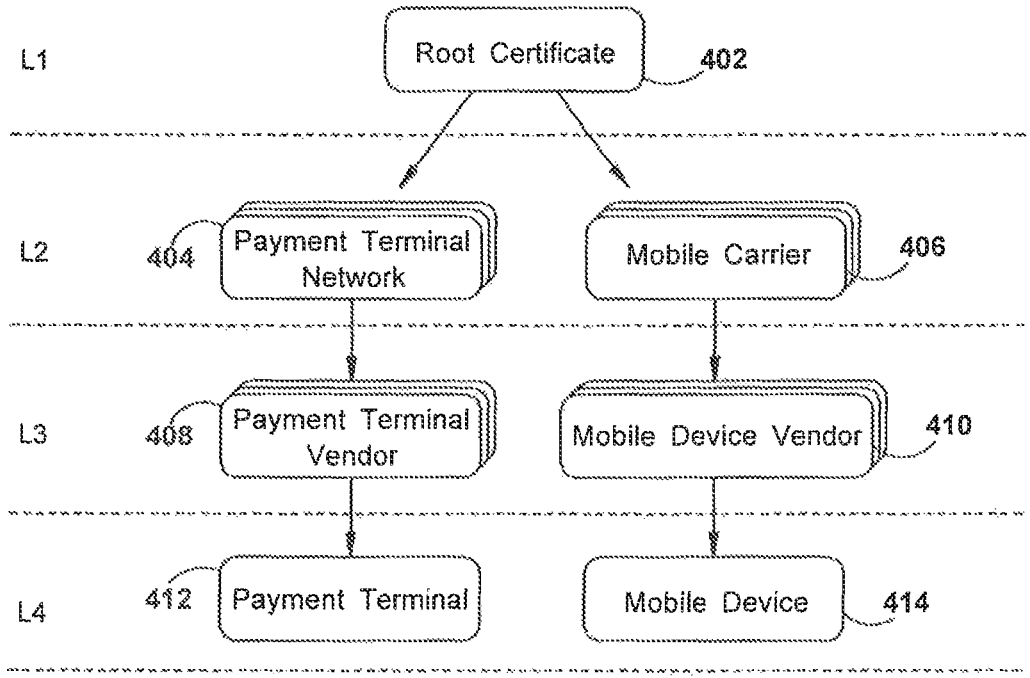
FIG. 4 is a schematic diagram of one exemplary embodiment of a certificate hierarchy.

The certificate module 302 can maintain a repository 316 of one or more digital certificates and an associated lookup table 314. FIG. 4 illustrates an exemplary certificate hierarchy 400 which can be maintained by the certificate module 302.

As shown, the hierarchy can include a root certificate 402 that identifies an industry-standard Root Certificate Authority (Root CA). Exemplary Root CAs include VeriSign, GlobalSign, DigiCert, and the like. The root certificate 402 forms the trust root for the certificate hierarchy 400, and can be an unsigned public key certificate or a self-signed certificate. Trustworthiness of the root certificate 402 can be established by secure physical distribution, e.g., during production of the payment terminal 102 as discussed in further detail below. For convenience of description, the root certificate 402 is referred to herein as a level 1 or "L1" certificate. It will be appreciated that the hierarchy 400 can include a plurality of L1 certificates, e.g., issued from a plurality of different Root CAs. Each L1 certificate, or the public key contained therein, can be associated with a unique identifier (a "Level1 ID"). The Level1 ID can be an industry unique number assignment similar to a MAC address, a hash of the entire L1 certificate, or some other unique code, string, number, etc. Each L1 certificate or its public key and the corresponding unique identifier can be associated with one another in the lookup table 314 such that, when a unique identifier is provided, the associated certificate(s) or public key(s) can be quickly retrieved from the certificate repository 316.

The certificate hierarchy can also include one or more levels of subordinate certificates which are signed by a superior certificate authority and thereby inherit the trustworthiness of the superior certificate authority.

In the illustrated embodiment, for example, the hierarchy 400 includes one or more payment terminal network certificates 404 issued from payment networks such as card-issuing banks, acquirers, or other payment processors. The illustrated hierarchy 400 also includes one or more mobile carrier certificates 406 issued from mobile carriers. For convenience of description, the payment terminal network certificates 404 and the mobile carrier certificates 406 are referred to herein as level 2 or "L2" certificates. Each L2 certificate can be stored in the certificate repository 316 and the certificate or its public key can be associated in the lookup table 314 with a unique identifier (a "Level2ID"), as described above. The L2 certificates are immediately-subordinate to the L1 certificates, and can therefore be signed by the Root CA to inherit the Root CA's trustworthiness. Each L2 public key can thus be indexed in the lookup table 314 by a unique identifier that specifies the L2 public key and its superior L1 public key (e.g., Level2ID+Level1ID).

The hierarchy can also include certificates which are subordinate to the L2 certificates. In the illustrated embodiment, for example, the hierarchy 400 includes one or more payment terminal vendor certificates 408 issued from manufacturers or distributors of payment terminals. The hierarchy 400 can also include one or more mobile device vendor certificates 410 issued from manufacturers or distributors of mobile devices. For convenience of description, the payment terminal vendor certificates 408 and the mobile device vendor certificates 410 are referred to herein as level 3 or "L3" certificates. Each L3 certificate can be stored in the certificate repository 316 and the certificate or its public key can be associated in the lookup table 314 with a unique identifier (a "Level3ID"), as described above. The L3 certificates are immediately-subordinate to the L2 certificates, and can therefore be signed by a L2 certificate authority to inherit the L2 certificate authority's trustworthiness. Each L3 public key can thus be indexed in the lookup table 314 by a unique identifier that specifies the L3 public key and its superior L2 and L1 public keys (e.g., Level3ID+Level2ID+Level1ID).

The hierarchy 400 can also include a device-specific certificate 412 unique to the individual payment terminal 102. For convenience of description, the device-specific certificate 412 is referred to herein as a level 4 or "L4" certificate. The L4 certificate can be signed by a L3 certificate authority to inherit the L3 certificate authority's trustworthiness.

The root certificates 402, payment terminal network certificates 404, payment terminal vendor certificates 408, and the payment terminal certificate 412 can be referred to as "terminal-side" certificates. The root certificates 402, mobile carrier certificates 406, mobile device vendor certificates 410, and a mobile device certificate 414 (discussed further below) can be referred to as "mobile-side" certificates. Certificates can be referred to as "superior certificates," "more-superior certificates", "inferior certificates", "more-inferior certificates," and so forth based on their position within the hierarchy 400 and the certificate whose perspective is being described. For example, from the perspective of a L4 certificate, a L3 certificate can be referred to as a superior certificate and a L2 certificate can be referred to as a more-superior certificate. Likewise, from the perspective of a L4 certificate, a L2 certificate can be referred to as a superior certificate and a L1 certificate can be referred to as a more-superior certificate.

While a four-level certificate hierarchy 400 is shown and described herein, it will be appreciated that the hierarchy can include any number of levels. For example, a two-level hierarchy can be used in which device-specific certificates are signed directly by a Root CA. A three-level hierarchy can also be used in which device-specific certificates are signed by a sub-CA whose certificate is in turn signed by a Root CA. Hierarchies in which three or more intermediate certificate authorities exist in the chain of trust between the device-specific certificate and a Root CA can also be used. In addition, the level in the hierarchy at which a particular entity or class of certificates resides can vary from what is shown and described herein. For example, mobile carrier certificates can be subordinate to mobile device vendor certificates. In some embodiments, the repository 316 can be configured, for one or more certificates in the hierarchy 400, to store only the encrypted public key portion of said certificate(s) (e.g., the L3 and L4 certificates).

In some embodiments, the certificate hierarchy 400 can be part of a public key infrastructure (PKI), for example according to the X.509 industry standard. A PKI uses public key/private key pairs to securely encrypt and decrypt information. A public key can be freely distributed and can be used to encrypt the information. To decrypt the information, however, a party must possess a private key associated with the public key. An exemplary public key/private key encryption algorithm is the RSA cryptography system. A digital certificate can include a public key and a digital signature. The digital signature is created using a party's private key, such that anyone with access to the party's public key can prove that the signer had access to the party's private key and therefore that the signature is authentic.

Thus, in the example above, the Root CA stores a private key in a highly-secure location. The root certificate 402 stored in the certificate repository 316 includes the public key that corresponds to the private key and a digital signature signed by the Root CA using the private key. A known-good root certificate 402 can be installed in a controlled environment (e.g., during manufacture) such that the certificate can be trusted. Other certificates in the repository 316 can be trusted or authenticated based on a hierarchical system of cryptographic keys and digital signatures that traces back to the root certificate, as will be appreciated by those skilled in the art.

Figure 5:
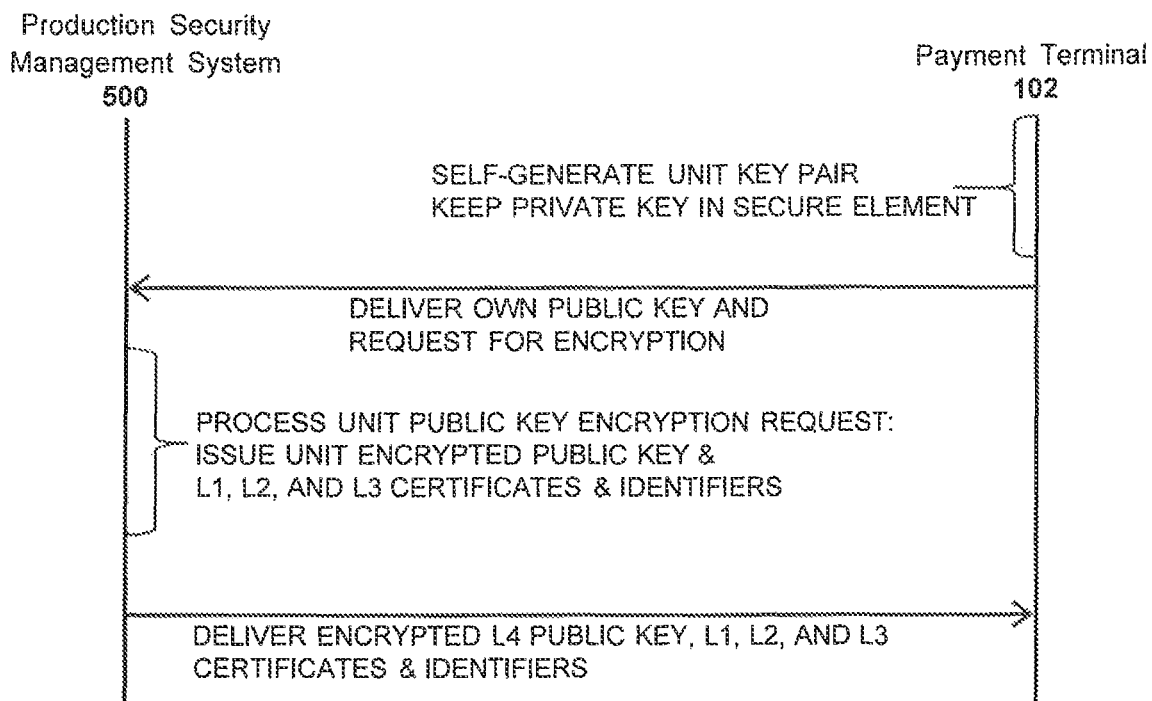
FIG. 5 is a sequence diagram of one exemplary method of managing digital certificates during production of a payment terminal.

FIG. 5 illustrates an exemplary sequence diagram for pre-loading the certificate repository 316 during manufacture or production of the payment terminal 102. Referring now to FIGS. 3, 4, and 5, first, the payment terminal 102 self-generates a device-specific L4 key pair. The private key is stored in a secure location within the payment terminal 102, e.g., the secure element 216. The public key is delivered to a production security management system 500 with a request for encryption. The production security management system 500 encrypts the device-specific L4 public key using its own private key (e.g., a L3 payment terminal vendor private key). The resulting public key certificate (signed by the L3 sub-CA) is then returned to the payment terminal 102. The other public key certificates in the chain of trust for this particular payment terminal (e.g., the L1 root certificate 402, the L2 payment terminal network certificate 404, and the L3 payment terminal vendor certificate 408) are also sent to the payment terminal 102, along with their corresponding unique identifiers (Level1ID, Level2ID, and Level3ID). Because the production security management system 500 is a controlled environment, known-good certificates can be pre-loaded into the certificate repository 316 of the payment terminal 102.

The production security management system 500 can also pre-load in the certificate repository 316 a plurality of mobile-side certificates and their corresponding unique identifiers. Alternatively, or in addition, one or more of the mobile-side certificates can be loaded into the certificate repository 316 in the field, for example via a network such as the fueling payment network 112. Thus, when it becomes necessary for the payment terminal 102 to authenticate a mobile device 104, the payment terminal can have pre-installed one or more certificates in the mobile device's chain of trust.

Once the mobile-side certificates are loaded in the certificate repository 316, they can be pre-authenticated. For example, a L3 mobile-side certificate (e.g., a mobile device vendor certificate 410) can be pre-authenticated by the certificate module 302 against its corresponding L2 and L1 certificates such that the given L3 public key can be used directly at run-time without requiring a time-consuming L3 certificate authentication process to be executed at run-time. If the pre-authentication is successful, the now-trusted L1, L2, and L3 public keys can be stored in the certificate repository 316 with a corresponding unique identifier being added to the lookup table 314. In some embodiments, the unique identifier can be a concatenation of the Level1ID, the Level2ID, and the Level3ID. The following pseudo code demonstrates the process of pre-authenticating a L3 certificate and indexing its public key in the lookup table 314 according to its chain of trust:

Level1 PubKey=RetrievePublicKeyFromCertificate (Level1);
    AddIntoLevel1PublicKeyLookup (Level1PubKey, Level1ID);
    Level2PubKey=DecryptPubKeyFromCertificate (Level2, Level1PubKey);
    AddIntoLevel2PublicKeyLookup (Level2PubKey, Level1ID, Level2ID);
    Level3PubKey=DecryptPubKeyFromCertificate (Level 3, Level2PubKey);
    AddIntoLevel3PublicKeyLookup (Level3PubKey, Level1ID, Level2ID, Level3ID);

The certificate module 302 can thus be configured to pre-authenticate one or more mobile-side certificates to expedite run-time authentication of a mobile device 104.

The authentication request receiving module 304 can be configured to receive an authentication request from a device seeking authentication (e.g., a mobile device 104). The authentication request can include a variety of information. In some embodiments, the authentication request can include a device-specific public key (e.g., a L4 public key) of the mobile device 104. The request can also include one or more superior public keys in the mobile-side certificate hierarchy. While the request can include the entire certificate(s), in some embodiments, only the public key portion of the certificate is included, thereby reducing the data payload and speeding transaction time. The request can also include identification information for specifying the chain of trust by which the mobile device 104 traces back to a mutual trusted root certificate 402. For example, the request can include a concatenation of unique identifiers associated with each certificate (or public key thereof) in the chain of trust. The request can also include information used as a precursor to a session key which ultimately can be used to encrypt sensitive data once mutual authentication is complete. For example, the precursor can be or can include a random number generated by the mobile device 104.

The authentication module 306 can be configured to validate public keys received in the authentication request.

In particular, the authentication module 306 can use the identification information in the request to determine from the lookup table 314 the set of pre-authenticated public keys required to decrypt the device-specific public key included in the request. The authentication module 306 can also be configured to request any certificates in the chain that may be missing from the certificate repository 316, e.g., from the mobile device 104 or from the fueling payment network 112.

The session key generation module 308 can be configured to generate a session key when the authentication request is successfully validated. For example, the session key generation module 308 can combine a session key precursor generated by the payment terminal 102 (e.g., a random number) with the session key precursor included in the request to produce a final session key. The session key can be used by two mutually-authenticated devices to encrypt and decrypt information communicated between the devices. The session key generation module 308 can also be configured to generate a checksum for use by a mutually-authenticated party to validate the session key.

The authentication response transmitting module 310 can be configured to transmit an authentication response to the mobile device 104. The authentication response can include a variety of information. In some embodiments, the authentication response can include a device-specific public key (e.g., a L4 public key) of the payment terminal 102. The response can also include one or more superior public keys in the terminal-side certificate hierarchy. While the response can include the entire certificate(s), in some embodiments, only the public key portion of the certificate is included, thereby reducing the payload and speeding transaction time. The response can also include identification information for specifying the chain of trust by which the payment terminal 102 traces back to a mutual root certificate 402. For example, the response can include a concatenation of unique identifiers associated with each certificate (or public key thereof) in the chain of trust. The response can also include the encrypted session key and checksum.

The secure information receiving module 312 can be configured to receive secure information from an authenticated device and to decrypt the information using the session key. In particular, a user's payment or loyalty information can be encrypted by the mobile device 104 using the session key and received by the secure information receiving module 312. The secure information receiving module 312 can then decrypt the information using the session key such that the payment terminal 102 can complete the transaction.

Mobile Device Modules

Figure 6:
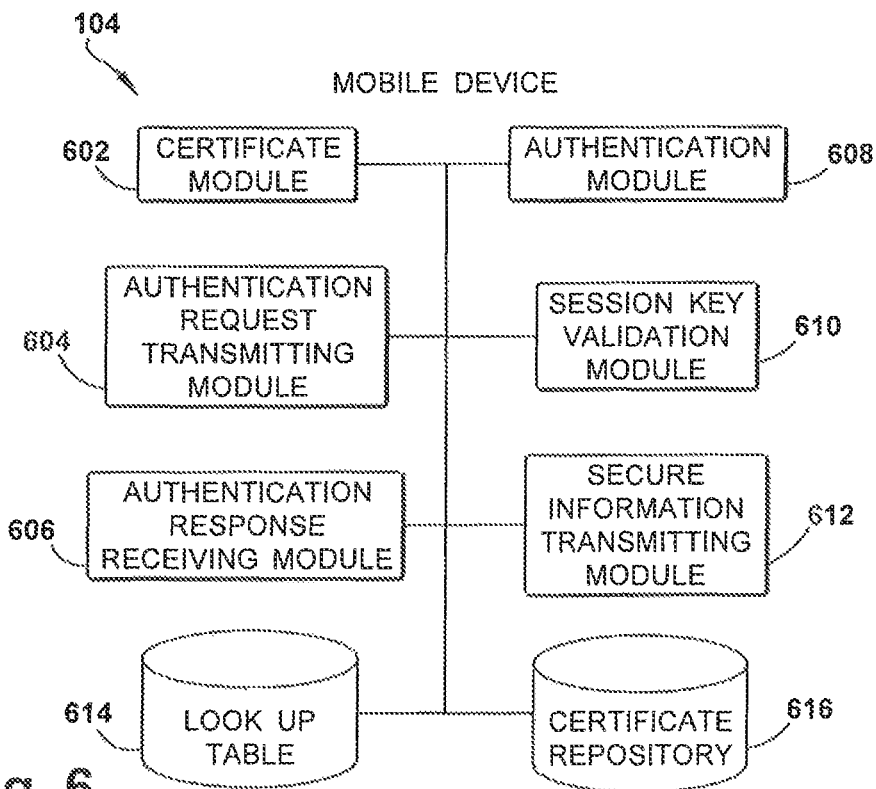
FIG. 6 is schematic diagram of one exemplary embodiment of a mobile device.

FIG. 6 is a schematic diagram of the modules of one exemplary embodiment of the mobile device 104. As shown, the mobile device 104 can include a certificate module 602, an authentication request transmitting module 604, an authentication response receiving module 606, an authentication module 608, a session key validation module 610, and a secure information transmitting module 612. The mobile device 104 can also include a lookup table 614 and a certificate repository 616.

The certificate module 602, lookup table 614, and certificate repository 616 of the mobile device 104 are substantially identical to those of the payment terminal 102, with a few exceptions as discussed below. One difference is that the L4 certificate 414 in the certificate module 602 corresponds to the mobile device 104 instead of the payment terminal 102. The mobile device 104 is pre-loaded with certificates installed during manufacture and production of the mobile device 104, or the certificates can be downloaded via the mobile payment cloud 116 or the mobile loyalty cloud 114.

The certificate hierarchy of the mobile device 104 is the same as that described above, with the mobile device 104 including the certificates in its own chain of trust as well as one or more pre-authenticated terminal-side certificates.

The authentication request transmitting module 604 is configured to assemble the authentication request described above and to send the request to the payment terminal 102 when triggered by a user (e.g., when the user places the mobile device 104 in proximity to the payment terminal, when the user launches an application on the mobile device, or when the user actuates a user interface element on the mobile device).

The authentication response receiving module 606 is configured to receive the authentication response described above from the payment terminal 102.

The authentication module 608 is configured to authenticate the L4 public key received from the payment terminal 102 using an authentication system as described above with respect to the authentication module 306 of the payment terminal 102.

The session key validation module 610 is configured to decrypt the session key received from the payment terminal 102 using the payment terminal's L4 public key and to validate the session key using the checksum received from the payment terminal.

The secure information transmitting module 612 is configured to encrypt secure information using the session key and to transmit the encrypted secure information to the payment terminal 102 to complete a transaction.

Operation

Figure 7:
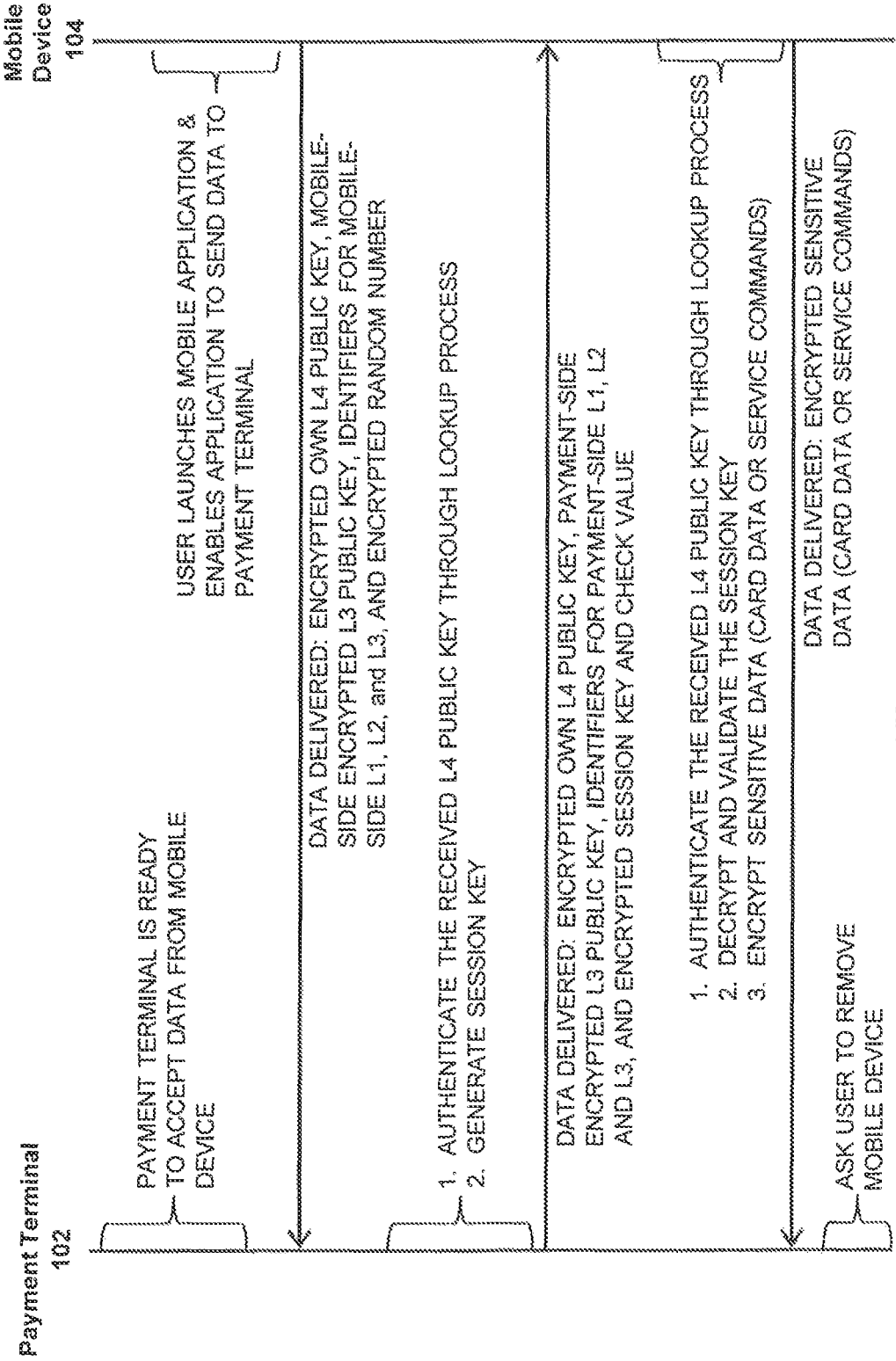
FIG. 7 is a sequence diagram of one exemplary embodiment of a mutual authentication method conducted by a payment terminal and a mobile device.
Figure 8:
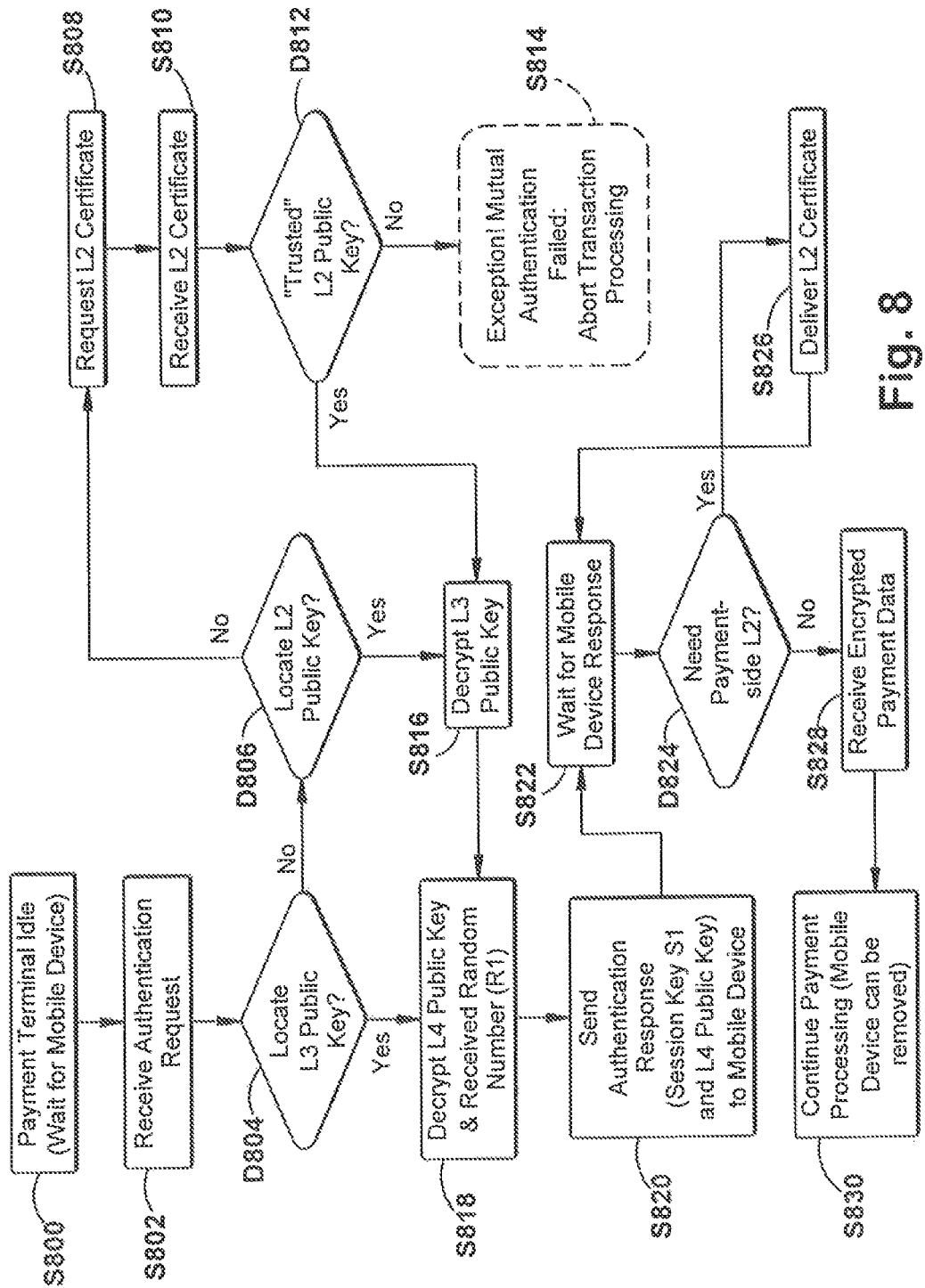
FIG. 8 is a flowchart that depicts the method of FIG. 7 from the perspective of the payment terminal.
Figure 9:
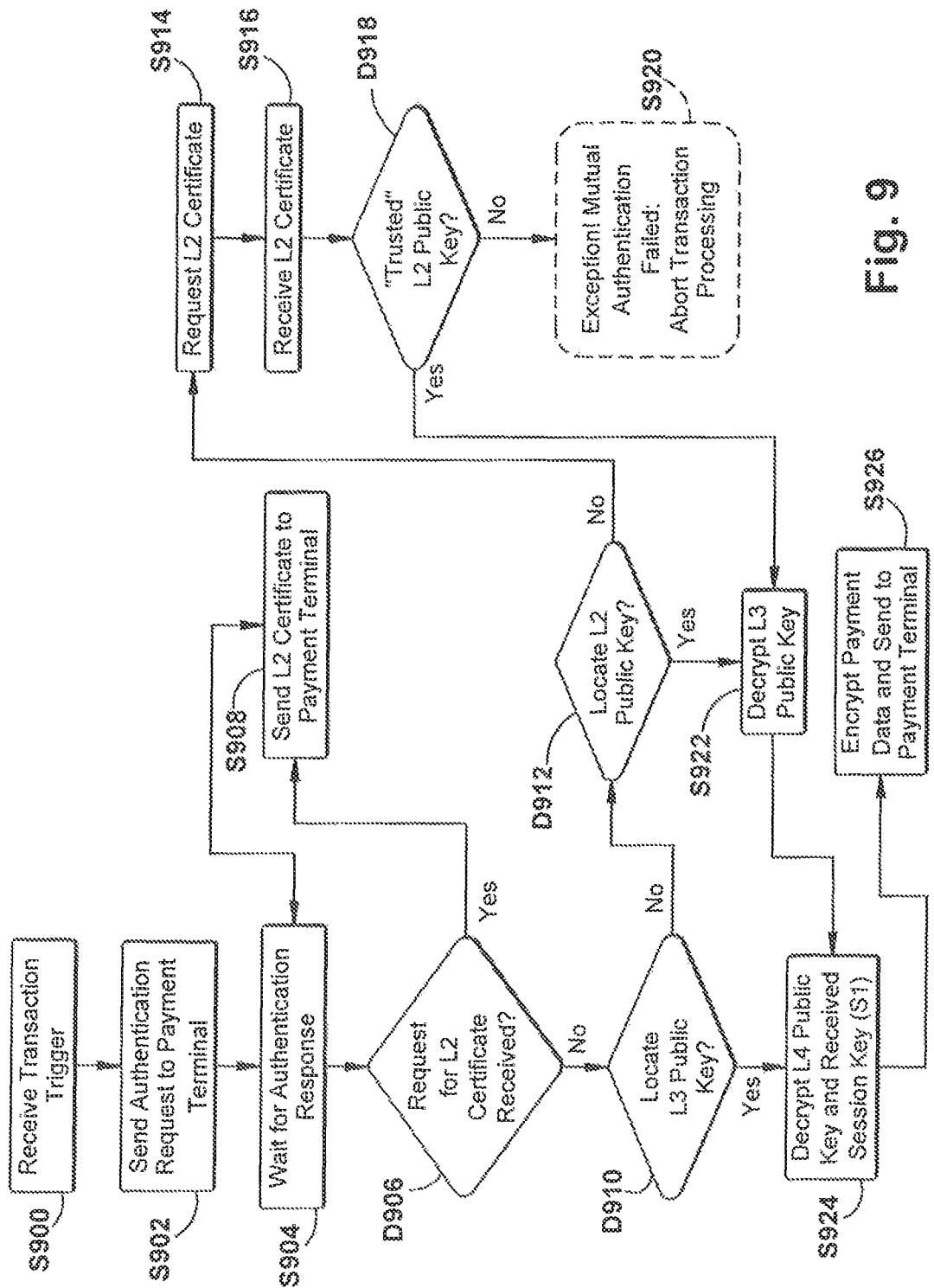
FIG. 9 is a flowchart that depicts the method of FIG. 7 from the perspective of the mobile device.

An exemplary method of conducting a mutually-authenticated transaction is illustrated schematically in FIGS. 7, 8, and 9. While various methods disclosed herein may be shown in relation to flowcharts or sequence diagrams, it should be noted that any ordering of method steps implied by such flowcharts, sequence diagrams, or the description thereof is not to be construed as limiting the method to performing the steps in that order. Rather, the various steps of each of the methods disclosed herein can be performed in any of a variety of sequences. In addition, as the illustrated flowcharts and sequence diagrams are merely exemplary embodiments, various other methods that include additional steps or include fewer steps than illustrated are also within the scope of the present disclosure.

FIG. 7 is a sequence diagram of the mutually-authenticated transaction. The mutual authentication process can, in some embodiments, involve only a single exchange between the payment terminal 102 and the mobile device 104 (e.g., an authentication request transmitted from the mobile device 104 to the payment terminal 102 and an authentication response transmitted from the payment terminal 102 to the mobile device 104). Completing the authentication process in a single exchange can advantageously decrease the amount of time required to complete a transaction, increasing user convenience. Initially, the payment terminal 102 is in a ready state waiting for a mobile device 104 to initiate a transaction. The payment terminal 102 can display a message requesting that the user initiate a transaction using their mobile device 104.

To begin the transaction, the mobile device 104 sends an authentication request to the payment terminal 102. For example, the authentication request transmitting module 604 of the mobile device 104 can transmit an authentication request to the authentication request receiving module 304 of the payment terminal 102. The authentication request can include:

(1) the device-specific (e.g., L4) public key of the mobile device 104, which is encrypted by a mobile-side L3 private key, (2) the mobile-side L3 public key, encrypted by a mobile-side L2 private key, (3) a unique identifier that specifies the chain of public keys required to decrypt the L4 public key of the mobile device 104 (e.g., Level1ID+Level2ID+Level3ID), and (4) a random number R1 generated by the mobile device 104 and encrypted by the mobile device's L4 private key.

Upon receipt of the authentication request, the payment terminal 102 can attempt to authenticate the received L4 public key using the lookup table 314 and certificate repository 316. In particular, the authentication module 306 of the payment terminal 102 can use the received unique identifier (Level1ID+Level2ID+Level3ID) to locate the pre-authenticated L3 public key that can decrypt the L4 public key of the mobile device 104. If the L3 public key is present in the payment terminal 102, the received L4 public key can be decrypted and then used to decrypt the random number R1.

In some instances, the L3 public key that can decrypt the L4 public key of the mobile device 104 may not be pre-loaded in the payment terminal 102. For example, the mobile-side L3 certificate may not yet be available for download through the fueling payment network 112, e.g., if the mobile device 104 is of a particular brand, model, or carrier that is new. In such cases, the authentication module 306 can use the received unique identifier without the Level3ID (i.e., Level1ID+Level2ID) to locate the pre-authenticated L2 public key that can decrypt the L3 public key of the mobile device 104. If the L2 public key is present in the payment terminal 102, the received L3 public key can be decrypted and then used, as described above, to decrypt the L4 public key which in turn decrypts the random number R1. The newly-decrypted L3 public key can then be stored in the certificate repository 316 for future use and its corresponding unique identifier (Level1ID+Level2ID+Level3ID) can be added to the lookup table 314.

If the L2 public key is not present in the payment terminal 102, the payment terminal can attempt to locate the L2 public key over a network, request the public key from the mobile device 104, or deny the transaction.

After the random number R1 is decrypted, the session key generation module 308 of the payment terminal 102 can generate a session key S1 to be used in carrying out the transaction. In some embodiments, the session key generation module 308 can generate its own random number R2 and create the session key S1 based on a combination of the mobile device's random number R1 and the payment terminal's random number R2. For example, the session key S1 can be defined by the exclusive or of R1 and R2:

S1=XOR (R1, R2)

The session key generation module 308 can also generate a checksum CHKS1 of the session key S1, for example by calculating a hash of the session key:

CHKS1=Hash (S1)

The session key generation module 308 can then encrypt the session key S1 using the mobile device's L4 public key, such that only the private key stored in the mobile device's secure element 216 can be used to decrypt and obtain the session key S1. The checksum CHKS1 can be encrypted using the payment terminal's own L4 private key.

The following pseudo code demonstrates the process of authenticating the mobile device 104 and generating the session key S1 and session key checksum CHKS1:

```
PubKey = Lookup(MobileDeviceLevel1ID + MobileDeviceLevel2ID +
MobileDeviceLevel3ID)
If (PubKey == null)
{
    Level2PubKey = Lookup (MobileDeviceLevel1ID +
    MobileDeviceLevel2ID);
    If (Level2PubKey != null)
    {
        PubKey = DecryptPubKey (Encrypted Level3 PubKey,
        Level2PubKey);
        NewCertificateAvailable = true;
    }
}
If (PubKey != null)
{
    Level4PubKey = Decrypt (Given Encrypted Level 4 Pub Key,
    PubKey);
    R1 = Decrypt (Given Encrypted R1, Level4PubKey);
    R2 = RandomGeneration( );
    S1 = R1 XOR R2;
    EncryptedS1 = Encrypt (S1, Level4PubKey);
    EncryptedCHKS1 = Encrypt (Hash(S1), MyPrivateKey);
}
```

As noted above, if the mobile-side L2 public key is not available at the payment terminal 102, it can be obtained in some instances from the fueling payment network 112, the fueling loyalty network 110, the mobile device 104, or some other source. An exemplary process for obtaining and decrypting the mobile-side L2 public key is demonstrated by the following pseudo code:

```
If (Level2PubKey == null)
{
    ObtainLevel2Certificate (*Given Level2);
    Level1PubKey = Lookup (Given MobileDeviceLevel1ID);
    If (Level1PubKey == null)
        Throw Exception of "No Pre-stored Trusted Level1 Root CA"
    Level2PubKey = DecryptPubKeyFromCertificate (Level2,
    Level1PubKey);
    PubKey = DecryptPubKey (Encrypted Level3 PubKey,
    Level2PubKey);
    NewCertificateAvailable = true;
}
```

As also noted above, the payment terminal 102 can be configured to store new certificates obtained at runtime (e.g., from the mobile device 104) and to add them to the lookup table 314 to facilitate faster processing in the future. An exemplary process for storing a new certificate and adding it to the lookup table 314 is demonstrated by the following pseudo code:

```
If (NewCertificateAvailable == true)
{
    If (CanStoreAdditionalPubKeyIntoLookupTable( ) == true)
    {
        AddIntoLevel3LookupTable (PubKey, MobileDeviceLevel1ID,
            MobileDeviceLevel2ID, MobileDeviceLevel3ID);
        AddIntoLevel2LookupTable (Level2PubKey,
        MobileDeviceLevel1ID,
            MobileDeviceLevel2ID);
        ReportToMyNetwork( );
    }
}
```

After generating the session key S1 and the session key checksum CHKS1, the payment terminal 102 can transmit an authentication response to the mobile device 104. In particular, the authentication response transmitting module 310 of the payment terminal 102 can transmit the authentication response to the authentication response receiving module 606 of the mobile device 104.

The authentication response can include:

(1) the device-specific (e.g., L4) public key of the payment terminal 102, which is encrypted by a terminal-side L3 private key, (2) the terminal-side L3 public key, encrypted by a terminal-side L2 private key, (3) a unique identifier that specifies the chain of public keys required to decrypt the L4 public key of the payment terminal 102 (e.g., Level1ID+Level2ID+Level3ID), (4) the session key S1, encrypted by the mobile device's L4 public key; and (5) the session key checksum CHKS1, encrypted by the payment terminal's L4 private key.

Upon receipt of the authentication response, the mobile device 104 can attempt to authenticate the received L4 public key using the lookup table 614 and the certificate repository 616. In particular, the authentication module 608 of the mobile device 104 can use the received unique identifier (Level1ID+Level2ID+Level3ID) to locate the pre-authenticated L3 public key that can decrypt the L4 public key of the payment terminal 102. If the L3 public key is present in the mobile device 104, the received L4 public key can be decrypted.

In some instances, the L3 public key that can decrypt the L4 public key of the payment terminal 102 may not be pre-loaded in the mobile device 104. For example, the terminal-side L3 certificate may not yet be available for download through the mobile loyalty cloud 114 or the mobile payment cloud 116, e.g., if the payment terminal 102 is of a particular brand, model, or payment network that is new. In such cases, the authentication module 608 can use the received unique identifier without the Level3ID (i.e., Level1ID+Level2ID) to locate the pre-authenticated L2 public key that can decrypt the L3 public key of the payment terminal 102. If the L2 public key is present in the mobile device 104, the received L3 public key can be decrypted and then used, as described above, to decrypt the L4 public key. The newly-decrypted L3 public key can then be stored in the certificate repository 616 for future use and its corresponding unique identifier (Level1ID+Level2ID+Level3ID) can be added to the lookup table 614.

If the L2 public key is not present in the mobile device 104, the mobile device can attempt to locate the L2 public key over a network, request the public key from the payment terminal 102, or deny the transaction.

If authentication is successful, the session key validation module 610 can use the mobile device's own L4 private key to decrypt the session key S1 and use the decrypted L4 public key of the payment terminal 102 to decrypt the session key checksum CHKS1. The session key validation module 610 can then check whether the checksum CHKS1 matches the session key S1. If a match is found, both the mobile device 104 and the payment terminal 102 are in possession of the agreed upon session key S1 and the mutual-authentication process is complete.

The session key S1 can then be used to encrypt and decrypt user data transmitted between the mobile device 104 and the payment terminal 102. For example, the secure information transmitting module 612 of the mobile device 104 can encrypt the user's primary account number (PAN), credit card expiration date, and credit card security code (CVV) using the session key S1 and can transmit the encrypted data to the payment terminal 102. The secure information receiving module 312 of the payment terminal 102 can receive the encrypted payment information and decrypt it using the session key S1. User loyalty information can be communicated in a similar fashion.

The following pseudo code demonstrates the process of authenticating the payment terminal 102 and encrypting the payment information using the session key S1, as well as obtaining additional certificates and updating the lookup table 614 if necessary:

```
PubKey = Lookup(PaymentTerminalLevel1ID +
PaymentTerminalLevel2ID +
            PaymentTerminalLevel3ID)
If (PubKey == null)
{
    Level2PubKey = Lookup(PaymentTerminalLevel1ID +
            PaymentTerminalLevel2ID);
    If (Level2PubKey != null)
    {
        PubKey = DecryptPubKey (Encrypted Level3 PubKey,
        Level2PubKey);
        NewCertificateAvailable = true;
    }
    If (Level2PubKey == null)
    {
        ObtainLevel2Certificate (*Given Level2);
        Level1PubKey = Lookup (Given PaymentTerminalLevel1ID);
        If (Level1PubKey == null)
            Throw Exception of "No Pre-stored Trusted Level1
            Root CA"
        Level2PubKey = DecryptPubKeyFromCertificate (Level2,
        Level1PubKey);
        PubKey = DecryptPubKey (Encrypted Level3 PubKey,
        Level2PubKey);
        NewCertificateAvailable = true;
    }
}
If (PubKey != null)
{
    Level4PubKey = Decrypt (Given Encrypted Level 4 Pub Key,
    PubKey);
    S1 = Decrypt (Given Encrypted S1, MyPrivateKey);
    CHKS1 = Decrypt(Given Encrypted CHKS1, Level4PubKey);
    If (Hash(S1) == CHKS1)
    {
        EncryptedCardData = EncryptCardData (PAN, Expiration,
        CVV, S1);
    }
}
If (NewCertificateAvailable == true)
{
    If (CanStoreAdditionalPubKeyIntoLookupTable( ) == true)
    {
        AddIntoLevel3LookupTable (PubKey,
        PaymentTerminalLevel1ID, PaymentTerminalLevel2ID,
            PaymentTerminalLevel3ID);
        AddIntoLevel2LookupTable (Level2PubKey,
        PaymentTerminalLevel1ID,
            PaymentTerminalLevel2ID);
        ReportToMyNetwork( );
    }
}
```

Once received by the payment terminal 102, the payment and/or loyalty information can be processed through the fuel payment network 112 and fuel loyalty network 110 in the same manner as if the user had presented a traditional magnetic-stripe plastic card.

FIG. 8 provides an overview of the above-described method from the perspective of the payment terminal 102. Initially, in step S800, the payment terminal 102 is idle. In step S802, an incoming authentication request is received from a mobile device 104. In decision block D804, the payment terminal 102 determines whether a L3 public key capable of decrypting the received L4 public key of the mobile device 104 is available. If not, the payment terminal 102 determines at decision block D806 whether a L2 public key capable of decrypting the received L3 public key is available. If not, the L2 certificate is requested from the mobile device 104 in step S808, received in step S810, and assessed for trustworthiness in decision block D812. If the L2 certificate is not trusted, mutual authentication fails in step S814. If the L2 certificate is trusted or if the L2 public key is available in the payment terminal 102, the L3 public key is decrypted in step S816. If the L3 public key was decrypted in step S816 or was available in decision block D804, the received L4 public key and, in turn, the received random number R1 are decrypted in step S818. In step S820, the authentication response is delivered to the mobile device 104 for authentication and the payment terminal 102 waits for a response from the mobile device in step S822. If the mobile device 104 requests the terminal-side L2 certificate (yes in decision block D824), it is transmitted to the mobile device in step S826 and execution returns to step S822. If the mobile device 104 is able to authenticate the payment terminal 102, encrypted payment and/or loyalty information is received from the mobile device at step S828 and the payment is processed at step S830.

FIG. 9 provides an overview of the above-described method from the perspective of the mobile device 104. Initially in step S900, the mobile device 104 receives an instruction to initiate a transaction, for example when a user launches a mobile payment application or actuates a button or other user interface element. In step S902, the mobile device 104 sends an authentication request to the payment terminal 102, and waits at step S904 for a response from the payment terminal. If the mobile device 104 receives a request from the payment terminal 102 for the mobile-side L2 certificate, (yes in decision block D906), the mobile device sends the certificate in step S908 and execution returns to step S904. Otherwise, the mobile device 104 processes the authentication response received from the payment terminal 102 and determines in decision block D910 whether a L3 public key capable of decrypting the L4 public key of the payment terminal is present in the mobile device. If not, the mobile device 104 determines at decision block D912 whether a L2 public key capable of decrypting the received L3 public key is available. If not, the L2 certificate is requested from the payment terminal in step S914, received in step S916, and assessed for trustworthiness in decision block D918. If the L2 certificate is not trusted, mutual authentication fails in step S920. If the L2 certificate is trusted or if the L2 public key is available in the mobile device 104, the L3 public key is decrypted in step S922. If the L3 public key was decrypted in step S922 or was available in decision block D910, the received L4 public key and, in turn, the received session key S1 are decrypted in step S924. Finally, in step S926, the mobile device 104 sends sensitive data encrypted by the session key S1 to the payment terminal 102.

In the above examples, the authentication request and the authentication response each include an encrypted L4 public key and an encrypted L3 public key. It will be appreciated, however, that more or fewer public keys can be included in the authentication request and/or the authentication response. For example, the request and/or the response can include only a single key (e.g., the encrypted L4 public key). By way of further example, the request and/or the response can include the encrypted L4 public key, the encrypted L3 public key, and one or more additional keys, such as an encrypted L2 public key.

The method of FIGS. 7, 8, and 9 can thus permit the payment terminal 102 and the mobile device 104 of FIG. 1 to engage in secure communication using a fast mutual authentication process. In particular, the payment terminal 102 can receive an authentication request from the mobile device 104 and, if the mobile device is authenticated, reply with an authentication response. After this single exchange, assuming authentication is successful, both parties possess a secure session key which can be used to encrypt sensitive information for wireless transmission. For example, the mobile device 104 can use the session key to encrypt customer payment or loyalty information and transmit the encrypted information to the payment terminal 102, which can decrypt the information using the session key and then process the information through normal channels.

Service Access

In some embodiments, the mobile device can be a service mobile device possessed by a user seeking to access the payment terminal, or a fuel dispenser or other system of which it is a part, for service purposes. In such cases, instead of transmitting payment or loyalty information upon completion of the mutual authentication process, the service mobile device can be configured to transmit an instruction to open or unlock a service door, perform a diagnostic test, or perform other service-related functions. If the service mobile device is authenticated by the payment terminal, the payment terminal can respond to the service request by controlling an actuator to open or unlock the service door, etc. Accordingly, service personnel can be authenticated to prevent unauthorized access or unauthorized field service or troubleshooting operations, thereby providing improved security as compared with a traditional mechanical key model.

Advantages/Technical Effects

The systems and methods disclosed herein can produce a number of advantages and/or technical effects.

For example, in some embodiments, digital certificates are pre-stored and pre-authenticated on the payment terminal and the mobile device, such that a reduced-size public key/identifier pair can be exchanged instead of a plurality of larger certificates, thus enabling rapid authentication and transaction execution. In some embodiments, the entire mutual authentication process can be completed in less than 500 ms, less than 250 ms, or less than 100 ms. In some embodiments, the authentication response transmitting module can be configured to transmit the authentication response less than 500 ms, less than 250 ms, or less than 100 ms after an authentication request is received by the authentication request receiving module.

By way of further example, in some embodiments, secure mutual authentication between two devices can be completed with only one transfer from the first device (e.g., a payment terminal) to the second device (e.g., a mobile device) and one transfer from the second device to the first device, thus enabling rapid authentication and transaction execution.

Further exemplary advantages and/or technical effects which may be produced by one or more of the systems and methods disclosed herein include: (1) secure, mutually-authenticated communication between a mobile device and a payment terminal without requiring extensive changes to or integration of existing fuel payment infrastructure and mobile payment infrastructure, (2) a secure NFC interface to allow a payment terminal to mutually authenticate with a mobile payment application to enable secure fast communication between the two, (3) no requirement for change in communication between a mobile payment cloud and a payment terminal cloud, and (4) improved security for service access.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel dispenser, comprising:
a wireless transceiver configured to communicate wirelessly with a customer's mobile device, the transceiver comprising a near-field communication (NFC) transceiver of the fuel dispenser;
a secure element configured to store one or more pre-validated cryptographic keys; and
a processor coupled to the secure element and the wireless transceiver, the processor being programmed to
receive, via the wireless transceiver, an authentication request from the customer's mobile device, the authentication request including a public key and a random number, and the authentication request beginning a product purchase transaction between the fuel dispenser and the customer's mobile device for purchase of fuel that is dispensable from the fuel dispenser;
authenticate the customer's mobile device by validating the public key received in the authentication request based on the one or more pre-validated cryptographic keys stored in the secure element,
after the validating, generate a session key based on the random number received in the authentication request,
transmit, via the wireless transceiver, when the customer's mobile device is successfully authenticated, an authentication response including the session key to the customer's mobile device,
receive secure payment information from the customer's mobile device in reply to the transmitted authentication response, the secure payment information being encrypted by the session key,
decrypt the secure payment information using the session key,
use the decrypted secure payment information to complete the product purchase transaction,
generate a dispenser-specific key pair including a dispenser-specific private key and a dispenser-specific public key,
transmit the dispenser-specific public key to a product management security system that is external to the fuel dispenser,
after transmitting the dispenser-specific public key to the product management security system, receive from the product management security system:
the dispenser-specific public key encrypted with a private key of the product management security system,
a unique identifier for the dispenser-specific public key encrypted with the private key, the unique identifier and dispenser-specific key pair encrypted with the private key defining a first certificate,
a second certificate that is superior to the first certificate, and
a plurality of mobile-side certificates that are each associated with a different one of a plurality of mobile devices, and
store the first certificate the second certificate, and the mobile-side certificate in the secure element;
wherein the authentication request is received after storing the first certificate, the second certificate, and the mobile-side certificate in the secure element; and
wherein the customer's mobile device is authenticated by validating the public key-received in the authentication request based on the mobile-side certificate stored in the secure element that is associated with the customer's mobile device and based on at least one of the first and second certificates stored in the secure element.

2. The fuel dispenser of claim 1, wherein:
the public key is specific to the customer's mobile device and the public key is encrypted in the authentication request by a private key that is superior to the public key in a certificate hierarchy;
the authentication request includes a unique identifier that specifies the chain of public keys in the certificate hierarchy which ultimately decrypts the public key; and
the random number is encrypted by a private key corresponding to the public key.

3. The fuel dispenser of claim 2, wherein the authentication request does not include a digital certificate corresponding to the public key.

4. The fuel dispenser of claim 2, wherein the processor is configured to validate the authentication request by:
using a lookup table to determine whether a superior public key specified in the unique identifier is stored in the secure element and pre-validated; and
if the superior public key is stored in the secure element and pre-validated, retrieving the superior public key and decrypting the public key using the superior public key.

5. The fuel dispenser of claim 4, wherein the authentication request includes the superior public key and wherein the processor is configured to validate the authentication request by:
if the superior public key is not stored in the secure element or not pre-validated, using the lookup table to determine whether a more-superior public key specified in the unique identifier is stored and pre-validated in the secure element, and
if the more-superior public key is stored and pre-validated in the secure element, retrieving the more-superior public key and decrypting the superior public key using the more-superior public key; and
if the more-superior public key is not stored in the secure element or not pre-validated, at least one of requesting the more-superior public key from the customer's mobile device, obtaining the more-superior public key from a network, and rejecting the authentication request as originating from a non-authenticable mobile device.

6. The fuel dispenser of claim 2, wherein the session key comprises a combination of the random number and a random number generated at the fuel dispenser.

7. The fuel dispenser of claim 2, wherein the authentication response comprises:
a second public key specific to the fuel dispenser, the second public key being encrypted by a dispenser-side private key that is superior to the second public key in the certificate hierarchy;

a dispenser-side unique identifier that specifies the chain of public keys in the certificate hierarchy which ultimately decrypts the second public key;

the session key, the session key being encrypted by the public key that is specific to the customer's mobile device; and a session key checksum generated by the processor, the session key checksum being encrypted by a private key corresponding to the second public key of the fuel dispenser.

8. The fuel dispenser of claim 7, wherein the authentication response does not include a digital certificate corresponding to the second public key.

9. The fuel dispenser of claim 7, wherein the authentication response comprises a dispenser-side superior public key corresponding to the dispenser-side superior private key.

10. The fuel dispenser of claim 1, wherein the fuel dispenser is configured to complete an entire mutual authentication process with the customer's mobile device in less than 500 ms such that less than 500 ms passes between the receipt of the authentication request and the transmission of the authentication response.

11. The fuel dispenser of claim 1, wherein the fuel dispenser is configured to complete an entire mutual authentication process with the customer's mobile device in a single exchange that includes the authentication request and the authentication response.

12. The fuel dispenser of claim 1, wherein the fuel dispenser is configured to complete the product purchase transaction without communication between a mobile payment infrastructure to which the customer's mobile device is coupled and a payment infrastructure to which the fuel dispenser is coupled.

13. A secure communication method for execution by a fuel dispenser that includes a wireless transceiver configured to communicate wirelessly with a customer's mobile device, a secure element configured to store one or more pre-validated cryptographic keys, and a processor coupled to the secure element and the wireless transceiver, the method comprising:

receiving, via the wireless transceiver, an authentication request from the customer's mobile device, the authentication request including a public key and a random number, the transceiver comprising a near-field communication (NFC) transceiver of the fuel dispenser, and the authentication request begins a product purchase transaction between the fuel dispenser and the customer's mobile device for purchase of fuel that is dispensable from the fuel dispenser;

authenticating the customer's mobile device by using the processor to validate the public key received within the authentication request based on the one or more cryptographic keys stored in the secure element;

after validating the public key, using the processor to generate a session key based on the random number received in the authentication request;

transmitting, via the wireless transceiver, when the customer's mobile device is successfully authenticated, an authentication response including the session key to the customer's mobile device;

receiving, via the wireless transceiver, secure information from the customer's mobile device in reply to the transmitted authentication response, the secure information being encrypted by the session key;

decrypting the secure payment information using the session key;

using the decrypted secure payment information to complete the product purchase transaction;

generating, using the processor, a dispenser-specific key pair including a dispenser-specific private key and a dispenser-specific public key;

transmitting, via the wireless transceiver, the dispenser-specific public keys to a product management security system that is external to the fuel dispenser;

after transmitting the dispenser-specific public key to the product management security system, receiving, via the wireless transceiver, from the product management security system the dispenser-specific public key encrypted with a private key of the product management security system, a unique identifier for the dispenser-specific public key encrypted with the private key, the unique identifier and dispenser-specific key pair encrypted with the private key defining a first certificate, a second certificate that is superior to the first certificate, and a plurality of mobile-side certificates that are each associated with a different one of a plurality of mobile devices;

storing the first certificate, the second certificate, and the mobile-side certificate in the secure element;

wherein the authentication request is received after storing the first certificate, the second certificate, and the mobile-side certificate in the secure element; and wherein the customer's mobile device is authenticated by validating the public key received in the authentication request based on the mobile-side certificate stored in the secure element that is associated with the customer's mobile device and based on at least one of the first and second certificates stored in the secure element.

14. The method of claim 13, wherein:

the public key is specific to the customer's mobile device, and the public key is encrypted by a private key that is superior to the public key in a certificate hierarchy;

the authentication request includes a unique identifier that specifies the chain of public keys in the certificate hierarchy which ultimately decrypts the public key; and the random number encrypted by a private key corresponding to the public key.

15. The method of claim 14, wherein the authentication request does not include a digital certificate corresponding to the public key.

16. The method of claim 14, wherein validating the authentication request using the processor comprises:

using a lookup table to determine whether a superior public key specified in the unique identifier is stored in the secure element and pre-validated; and if the superior public key is stored in the secure element and pre-validated, retrieving the superior public key and decrypting the public key using the superior public key.

17. The method of claim 16, wherein the authentication request includes the superior public key and wherein validating the authentication request using the processor comprises:

if the superior public key is not stored in the secure element or not pre-validated, using the lookup table to determine whether a more-superior public key specified in the unique identifier is stored and pre-validated in the secure element, and if the more-superior public key is stored and pre-validated in the secure element, retrieving the more-superior public key and decrypting the superior public key using the more-superior public key; and if the more-superior public key is not stored in the secure element or not pre-validated, at least one of requesting the more-superior public key from the customer's mobile device, obtaining the more-superior public key from a network, and rejecting the authentication request as originating from a non-authenticable mobile device.

18. The method of claim 14, wherein the session key comprises a combination of the random number and a random number generated at the fuel dispenser.

19. The method of claim 14, wherein the authentication response comprises:

a second public key specific to the fuel dispenser, the second public key being encrypted by a dispenser-side private key that is superior to the second public key in the certificate hierarchy;

a terminal-side unique identifier that specifies the chain of public keys in the certificate hierarchy which ultimately decrypts the second public key;

the session key, the session key being encrypted by the public key that is specific to the customer's mobile device; and a session key checksum generated by the processor, the session key checksum being encrypted by a private key corresponding to the second public key of the fuel dispenser.

20. The method of claim 19, wherein the authentication response does not include a digital certificate corresponding to the second public key.

21. The method of claim 19, wherein the authentication response comprises a dispenser-side superior public key corresponding to the dispenser-side superior private key.

22. The method of claim 13, wherein the fuel dispenser completes an entire mutual authentication process with the customer's mobile device in a single exchange that includes the authentication request and the authentication response.

23. The method of claim 13, further comprising completing the product payment transaction without communication between a mobile payment infrastructure to which the customer's mobile device is coupled and a payment infrastructure to which the fuel dispenser is coupled.

* * * * *